United States Patent [19]

Ohki

[11] Patent Number: 5,257,075
[45] Date of Patent: Oct. 26, 1993

[54] IMAGE FORMING APPARATUS
[75] Inventor: Shigeru Ohki, Yokohama, Japan
[73] Assignee: Canon Kabushiki Kaisha, Tokyo, Japan
[21] Appl. No.: 845,669
[22] Filed: Mar. 4, 1992
[30] Foreign Application Priority Data
  Mar. 5, 1991 [JP] Japan .................. 3-038661
[51] Int. Cl.⁵ ............................................ G03G 21/00
[52] U.S. Cl. .................... 355/246; 355/208; 355/214; 355/228
[58] Field of Search ............... 355/208, 210, 214, 215, 355/228, 229, 246, 268, 259, 326

[56] References Cited

U.S. PATENT DOCUMENTS

| | | | |
|---|---|---|---|
| 3,898,006 | 8/1975 | Kimura et al. | 355/228 X |
| 4,395,476 | 7/1983 | Kanbe et al. | 430/102 |
| 4,641,200 | 2/1987 | Shoji et al. | 355/246 X |
| 4,709,250 | 11/1987 | Takeuchi | 355/214 X |
| 5,016,046 | 5/1991 | Nishiyama | 355/69 X |
| 5,084,733 | 1/1992 | Katoh et al. | 355/251 |
| 5,086,728 | 2/1992 | Kinoshita | 355/246 X |
| 5,119,129 | 6/1992 | Setani | 355/246 X |
| 5,128,718 | 7/1992 | Mizoguchi | 355/214 X |
| 5,146,273 | 9/1992 | Yamada | 355/208 |
| 5,153,609 | 10/1992 | Ando et al. | 355/208 X |

*Primary Examiner*—A. T. Grimley
*Assistant Examiner*—Matthew S. Smith
*Attorney, Agent, or Firm*—Fitzpatrick, Cella, Harper & Scinto

[57] ABSTRACT

An image forming apparatus includes an electrophotographic photosensitive member; a light source; a developing device for developing with a developer an electrostatic latent image formed on the photosensitive member by light from the light source, wherein the developer is a one component non-magnetic developer; and a controller responsive to image information to control a continuous light emitting period of the light source per one picture element.

10 Claims, 6 Drawing Sheets

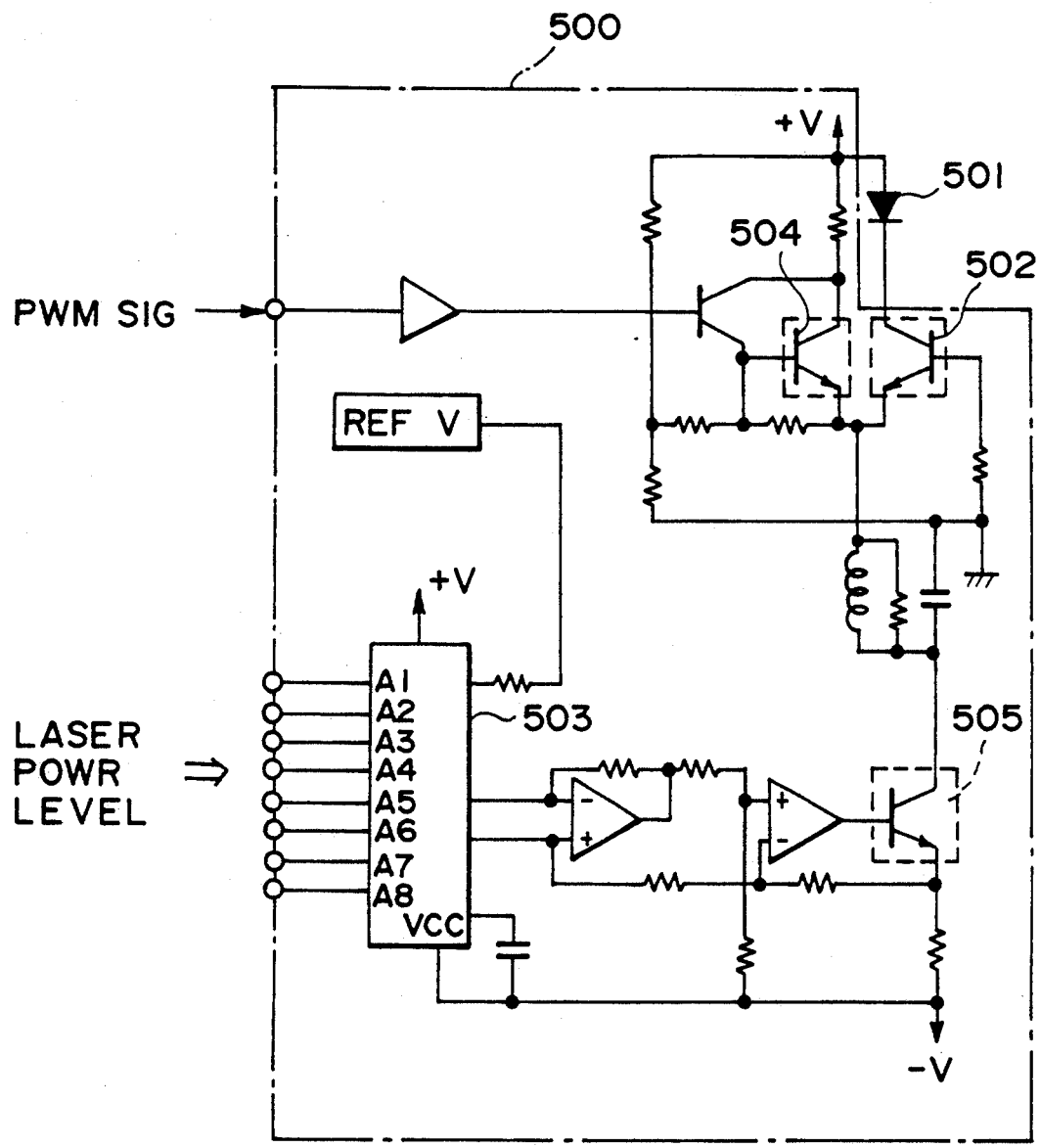
F I G. 3

IMAGE FORMING APPARATUS

FIELD OF THE INVENTION AND RELATED ART

The present invention relates to an image forming apparatus of an electrophotographic type such as a copying machine or laser beam printer.

An image forming apparatus in which an electrostatic latent image is developed with a dry non-magnetic one component developer, is known. In such an apparatus, a layer of developer having a small thickness is supplied into a developing zone on a developer carrying member, and the thickness is smaller than the minimum clearance between the electrophotographic photosensitive member and the developer carrying member in the developing zone (non-contact type development).

Application of a DC biased AC voltage which oscillates, is desirable from the standpoint of increasing the development efficiency in the non-contact type developing operation. The developer is vibrated by the oscillating voltage, so that the developer transfers from the developer carrying member to the photosensitive member so as to develop the latent image into a visualized image.

In the case of an analog copying operation using such a developing device, that is, in a copying operation in which an optical image of an original is directly projected through a lens onto a photosensitive member to form the electrostatic latent image, there occurs, as shown in FIG. 8, a negative property in which the density of the developed image at a high potential portion which is to be developed into the high density, becomes lower than that of the lo potential portion. In addition, since the inclination of the curve in the graph of FIG. 8 changes, reproducibility of the tone image is difficult. The solution to the problem is particularly desired in the case of a multi- or full-color image forming apparatus in which the defects in the respective color images are combined into an unacceptable defect in the final image.

SUMMARY OF THE INVENTION

Accordingly, it is a principal object of the present invention to provide an image forming apparatus and method in which the negative property is prevented when a non-magnetic one component developer is used.

It is another object of the present invention to provide an image forming apparatus and method in which the tone reproducibility is enhanced in an apparatus using a non-magnetic one component developer.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3 is a circuit diagram of a laser driving circuit.

DESCRIPTION OF THE PREFERRED EMBODIMENTS

Referring to the accompanying drawings, the preferred embodiments of the present invention will be described.

Figure 4:
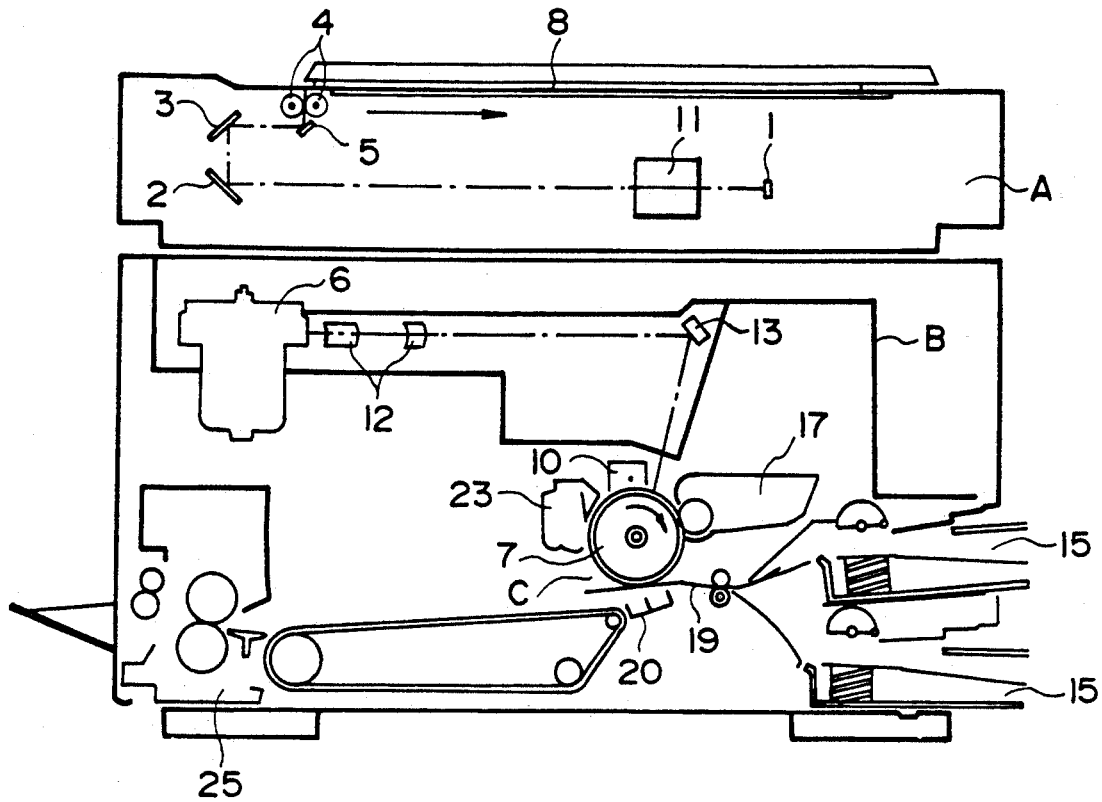
FIG. 4 is a sectional view of an image forming apparatus according to an embodiment of the present invention.

Referring first to FIG. 4, there is shown a copying apparatus as an exemplary image forming apparatus according to an embodiment of the present invention. The apparatus comprises an image reader A which scans an original, separating the image thereof into a combination of picture elements and photoelectrically converting the image density information thereof into electric signals. A writer B exposes the photosensitive member to the light signals modulated in accordance with the image information signal provided by the reader A so that an image is formed on the photosensitive member. In the reader A, the original to be copied is placed on the original supporting platen glass 8 and is illuminated by a halogen lamp 4. The light reflected by the original produces images on a CCD image sensor 1 by way of mirrors 2, 3 and 5 and a lens 11. The CCD image sensor photoelectrically converts the reflected light image. The image signals provided by the photoelectric conversion is A/D-converted to digital signals, which are processed by shade correction or another image signal processing. Then, the signals are transmitted through a connecting cable to the writer B. In the writer B, a semiconductor laser is on-off-controlled in accordance with the image signals by a laser driver, and the produced semiconductor laser beam scans the photosensitive drum 7 by way of a rotational polygonal mirror 6, a lens 12 and a reflecting mirror 13, so that a latent image is formed on drum 7. In the latent image formation, the laser driver modulates the pulse width in 256 steps for each of the picture elements by controlling the oscillating period of the laser, by which the 256 tone levels are selectable.

The image forming operation now will be described The photosensitive drum 7 rotates in the direction indicated by an arrow and is uniformly charged by a primary charger 10. It is then exposed to a light image which is in the form of a scanning laser beam having a modulated pulse width, in the exposure station. By doing so, an electrostatic latent image is formed on the surface of the photosensitive drum. The latent image is reverse-developed by the developing device 17 containing the non-magnetic one component developer, into a toner image (in the reverse development, the light potential areas subjected to the light receive the developer charged to the same polarity as the latent image). The toner image is transferred by a transfer charger 20 onto a transfer material 19 conveyed from the sheet feeding cassette 15. Then, the transfer material 19 is separated from the transfer drum 7, and the toner image is fixed on the transfer material 19 by the fixing device 25. Then, the transfer material is discharged. On the other hand, the photosensitive drum 7 is cleaned so that the residual developer is removed by a cleaner 23, and the photosensitive drum 7 is prepared for the next image formation.

Figure 5:
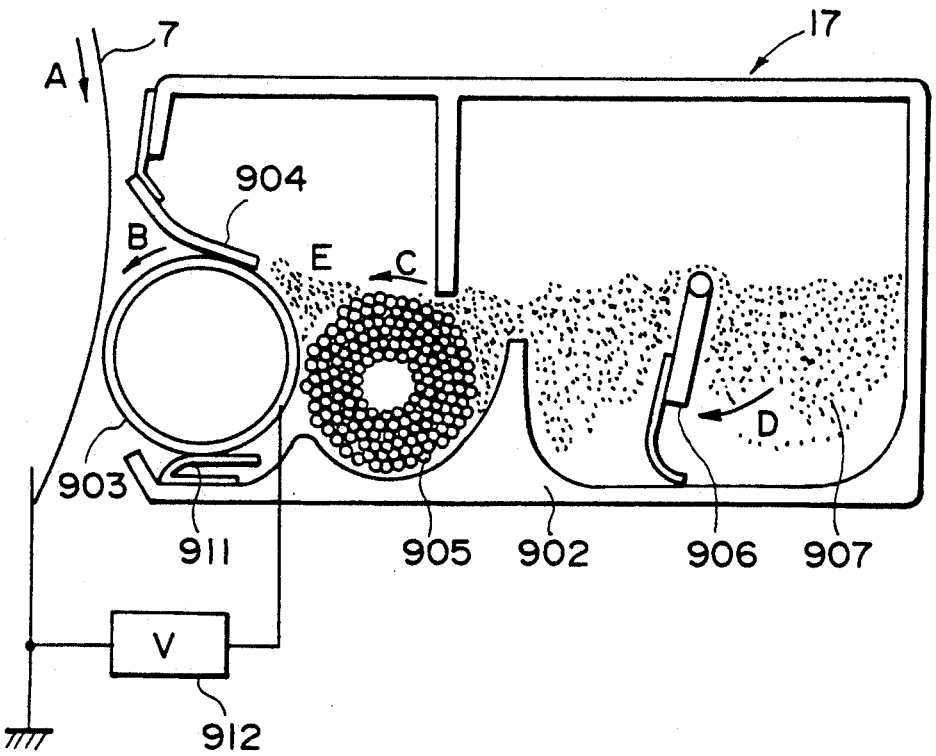
FIG. 5 is a sectional view of an example of a developing device usable with the present invention.

In this embodiment, the developing device 17 using a non-magnetic one component developer has a structure as shown in FIG. 5. The developing device now will be described in detail.

The developing device includes a developer supply container (container) 902 containing the one component non-magnetic developer, a developer carrying member in the form of a developing sleeve 903, a developer regulating means in the form of an elastic blade 904, a developer supplying and removing roller 905, and a toner stirring and feeding member 906.

The container 902 is provided with an aperture extending in a longitudinal direction of the developing device (perpendicular to the sheet of the drawing). The developing sleeve 903 is disposed in the aperture. The developing sleeve 903 is rotated in the direction indicated by an arrow B by a driving source.

Behind the developing sleeve 903, there is disposed a supply roller 905 in sliding contact therewith. The supply roller 905 is in the form of a sponge roller and rotates in the same rotational direction as the developing sleeve 903 (arrow C) to supply the,, developer onto the developing sleeve 903, and also to remove from the developing sleeve 903 the toner having passed through the developing zone.

Downstream of the sliding contact position between the supply roller 905 and the developing sleeve 903 with respect to the rotational direction of the developing sleeve 903, a free end of the elastic blade 904 is elastically contacted to the developing sleeve 903. In the contact portion, the amount of developer conveyed to the developing zone on the developing sleeve 903 is regulated. By this regulation, the thickness of the developer layer to be conveyed to the developing zone is made smaller than the minimum clearance between the sleeve 903 and the drum 7 in the developing zone. Thus, so-called non-contact development is carried out.

Preferably, the elastic blade 904 is made of a material having a position in the triboelectric series proper to electrically charge the toner to the desired polarity. For example, in order to charge a toner mainly comprising polystyrene carbon or the like to a positive polarity, the preferable materials include ethylene propylene rubber, fluorinated rubber, natural rubber, polychlorobutadiene, polyisobutylene, N.B.R. (nitrile-butadiene-rubber) or the like. In order to charge a toner to a negative polarity, the preferable materials include silicone rubber, polyurethane, styrene butadiene or the like. Although the above materials are preferable, they are not exclusive, since the toner is triboelectrically charged to a polarity for developing the latent image by friction with the sleeve 903.

Behind the supply roller 905 in the container 902, a toner stirring and feeding member 906 is disposed which rotates in the direction D so as to supply the one component non-magnetic developer 907 to the supply roller 905.

Below the developing sleeve 903, there is provided a sealing member 911 for sealing the clearance with the container 902. The sealing member 911 is made of Myler (available from Du Pont) or another flexible sheet.

A power source 912 is used for applying a developing bias voltage to the sleeve 903.

In the developing method of this embodiment, a non-contact developing method such as disclosed in Japanese Patent Application Publication No. 58/32375 is used. More particularly, the developing sleeve 903 is supplied with an oscillating voltage which is in the form of a DC biased AC voltage, so that the developer in the thin developer layer on the developing sleeve 903 is transferred onto the electrostatic latent image on the photosensitive drum 7 (non-contact type development).

By application of an oscillating bias voltage, that is, a voltage in which the maximum and minimum levels periodically and alternately appear, the developer vibrates in the developing zone, and the electrostatic latent image is reverse-developed with an increased developing efficiency.

The oscillating bias voltage preferably includes a phase for forming an urging electric field for urging the developer away from the sleeve toward the drum, and a phase for forming a back-transfer electric field for urging the developer away from the drum toward the sleeve, which phases appear alternately. In the light potential region of the latent image (the region exposed to the light and to receive the developer in the reverse-development), the urging or transfer electric field is stronger than the back-transfer electric field. On the other hand, in the dark potential region (the region not having been exposed to light and to constitute a background of the image in the reverse development), the back-transfer electric field is stronger than the transfer electric field. Therefore, the developer is transferred and retained in the light potential region (visualization), and deposition of the toner in the dark potential region (fog) can be avoided.

For example, a one component non-magnetic developer comprises non-magnetic toner particles having an average particle size of 8 microns with a binder polyester region and a small amount of fine silica particles for increasing the fluidability. The developing sleeve comprises an aluminum sleeve having a diameter of 20 mm and having a surface roughened by a sand paper #400. It is rotated at a peripheral speed of 280 mm/sec. The regulating member comprises a urethane rubber blade having a hardness of 73 degrees and a thickness of 2 mm. It is urged against the aluminum sleeve at a line pressure of 83 g/cm. A thin layer of the developer is conveyed into the developing zone in which the minimum clearance between the sleeve and the drum is 25 microns. The dark potential of the latent image is $-650$ V, and the light potential is $-120$ V. In this example, the oscillating bias voltage may have a peak-to-peak voltage of 2000 V, a frequency of 200 Hz in the form of a rectangular AC voltage waveform biased with $-400$ V DC voltage.

A description now will be made as to the modulating means for the laser beam. The modulating means is in the form of a pulse width modulation (PWM) means which modulates in accordance with the image density of a picture element to be recorded, a driving pulse width which determines the laser-on continuing (oscillating continuing) period. Therefore, the scanning period of the laser beam for the photosensitive member is controlled in accordance with the density of the picture element to be recorded. For a high density picture element, a light potential dot having a larger length in the scanning direction (larger area light potential dot) is formed. For a low density picture element, a shorter light potential dot (smaller area light potential dot) is formed.

Figure 1:
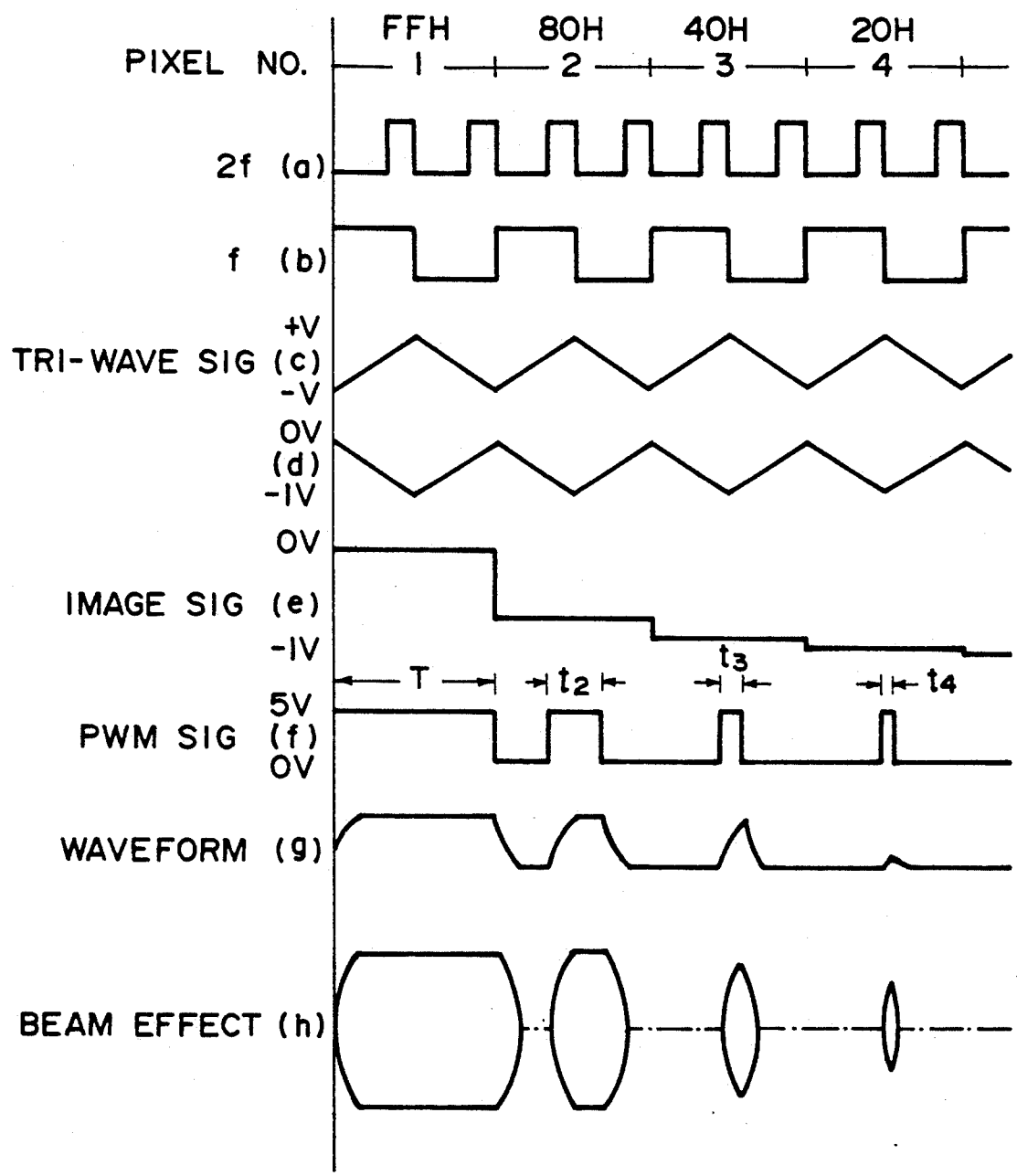
FIG. 1 shows an example of signal waveforms in the case of pulse width modulation.
Figure 2:
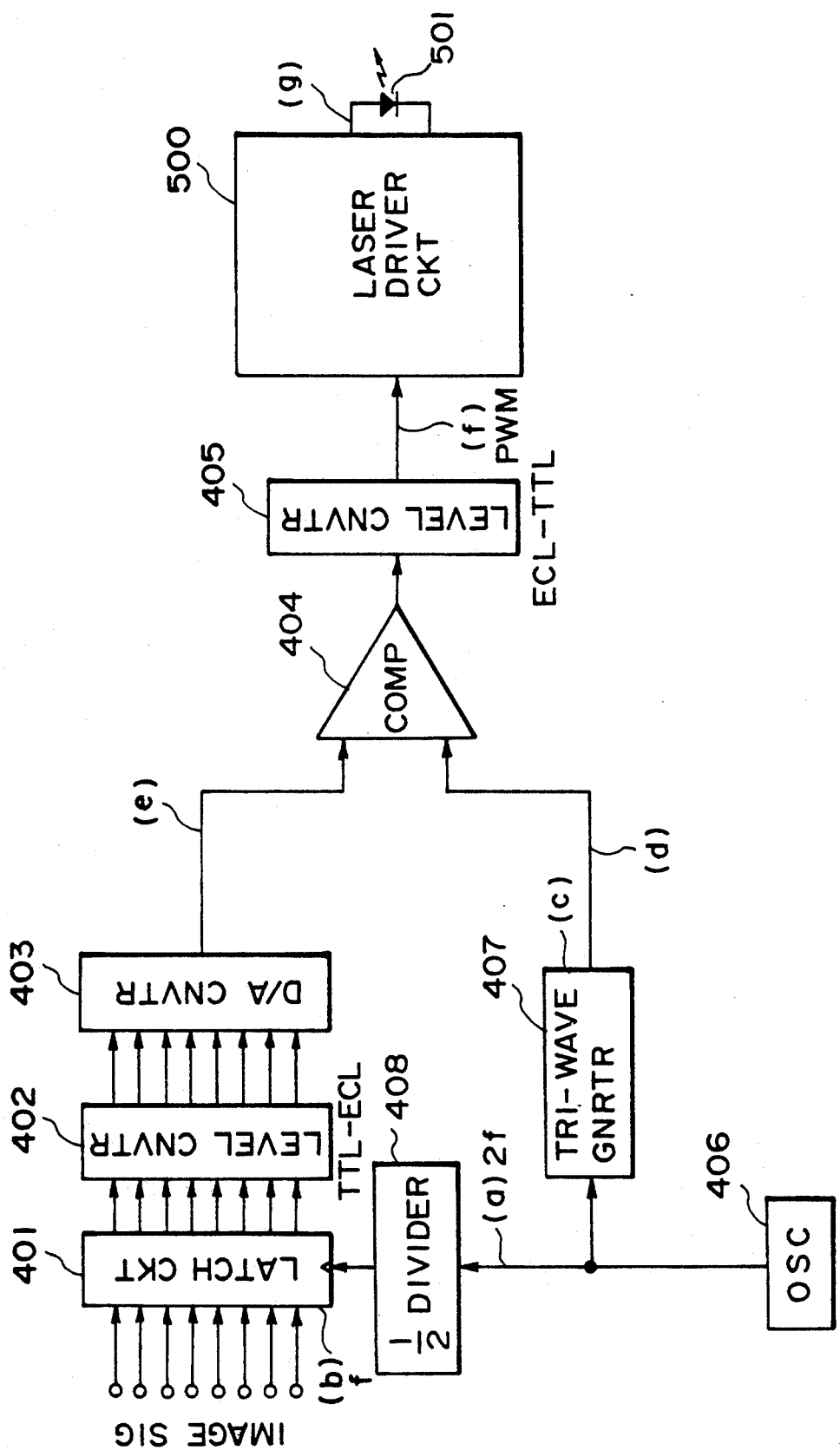
FIG. 2 is a block diagram for a pulse width modulation circuit.

Referring to FIG. 2, there is shown a block diagram for the PWM circuit. FIG. 3 shows a circuit diagram for a laser driver circuit used in this embodiment. FIG. 1 is a timing chart for the PWM circuit operation.

In FIG. 2, the PWM circuit comprises a TTL (transfer transistor logic) latching circuit 401 for latching an 8 bit image signal, a level converter 402 for converting the TTL logic level to a high speed ECL (emitter coupled logic) logic level, an ECLD-A converter 403, an ECL comparator 404 for producing a PWM signal, a level converter 405 for converting the ECL logic level to a TTL logic level, a clock signal oscillator 406 for producing clock signals $2f$ having a frequency which is double that of the image clock signal f, a triangular wave generator 407 for producing a substantially ideal triangular wave signal in synchronism with the clock signal $2f$, and a $\frac{1}{2}$ frequency divider 408 for dividing the frequency of the clock signal $2f$. In order to permit high speed operation, the ECL logic circuits are used in proper positions.

Referring to FIG. 1, the operation now will be described. In this Figure a signal (a) represents the clock signal $2f$, and a signal (b) represents the clock signal f having double the period. These signals are associated with the picture element numbers, as shown in this Figure. In the triangular wave generator 407, the clock signal $2f$ is first subjected to $\frac{1}{2}$ frequency dividing operation, and then the triangular wave signal (c) is produced, in order to maintain 50% of the duty ratio of the triangular wave signal. The triangular wave signal (c) is converted to ECL level (from 0 to $-1$ V) into a triangular wave signal (d).

On the other hand, the image signal has 256 tone levels (00H (white)—FFH (black)). The sign "H" means hexadecimal system. An image signal (e) is expressed as an ECL voltage level into which the image signal level is D/A converted. For example, the first picture element has the most black level FFH; the second picture element has an intermediate level 80H; the third picture element has a lower intermediate level 40H; and the fourth picture element has a further lower intermediate level 20H. They are expressed as voltages.

The comparator 404 compares a triangular wave signal (d) and an image signal (e) to produce a PWM signal having a pulse width T, $t_2$, $t_3$, $t_4$ or the like in accordance with the picture element density. The PWM signal is converted to the TTL level (0 or 5 V) into a PWM signal (f), which is supplied to the laser driver circuit 500.

As shown in FIG. 3, the laser driver circuit 500 is in the form of a constant current type laser driver circuit. It comprises a semiconductor laser element 501. The laser element 501 emits a laser beam when a switching transistor 502 is "on", and does not emit the laser beam when the transistor 502 is "off". The switching transistor 502 cooperates with a transistor 504 to constitute a current switching circuit. In accordance with the PWM signal (f) supplied thereto, it on-off-controls the constant current to be supplied to the semiconductor laser element 501 (communication). A constant current is supplied from a constant current source transistor 505. The level of the constant current is variable. The 8 bit laser power level supplied is converted to an analog voltage by a D/A converter 503, and determines the level of the constant current in accordance with a comparison between the analog voltage and a reference voltage.

Actually, however, the on/off emission of the laser beam involves delays with respect to the PWM signal (f) because of the semiconductor laser element 501 and the driving circuit 500 therefor, as shown by the waveform (g), so that the resultant waveform is as shown by (h) in FIG. 1. The laser beam effect (h) shows the state of laser beam emission in two dimensions. More particularly, the abscissa represents the beam scanning (movement) direction.

Figure 7:
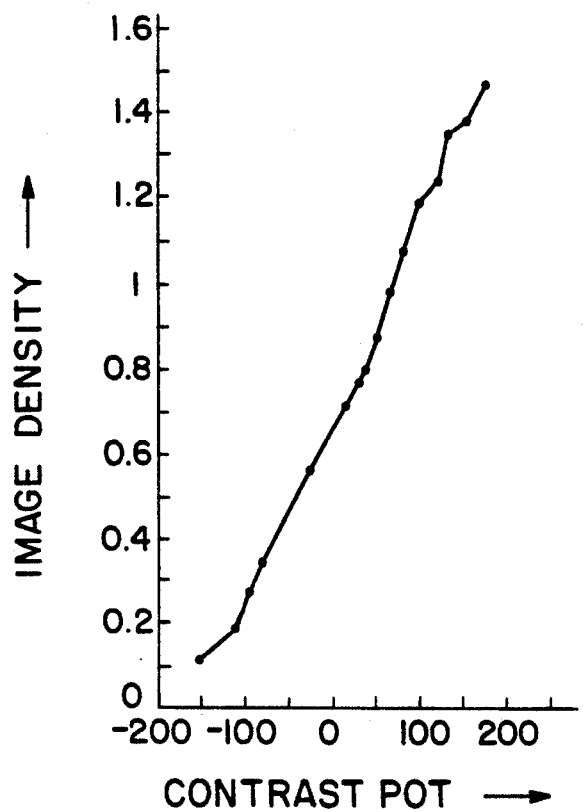
FIG. 7 is a graph of contrast potential vs. image density, showing the advantageous effects of the present invention.

As will be understood from the foregoing, in this embodiment, latent image formation using PWM modulation is used in the image forming apparatus having a developing device using a non-magnetic one component developer. Therefore, the developing property, and more particularly, the V-D property is as shown in FIG. 7. As compared with the V-D property in an analog optical system shown in FIG. 8, the linearity in the intermediate tone is improved, so as to permit the smooth tone reproduction and to prevent the appearance of the negative property.

Figure 8:
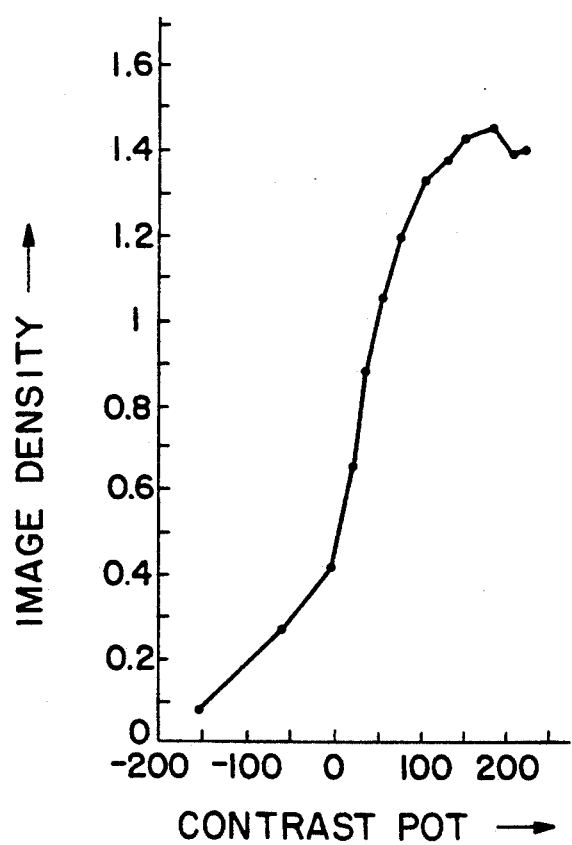
FIG. 8 is a similar graph but in a conventional apparatus.

In FIGS. 7 and 8, the contrast potential (abscissa) is a difference between an average potential of a latent image corresponding to a certain density level and a DC voltage component of the oscillating bias voltage, that is, a time integration of the oscillating bias voltage in one period.

Figure 6:
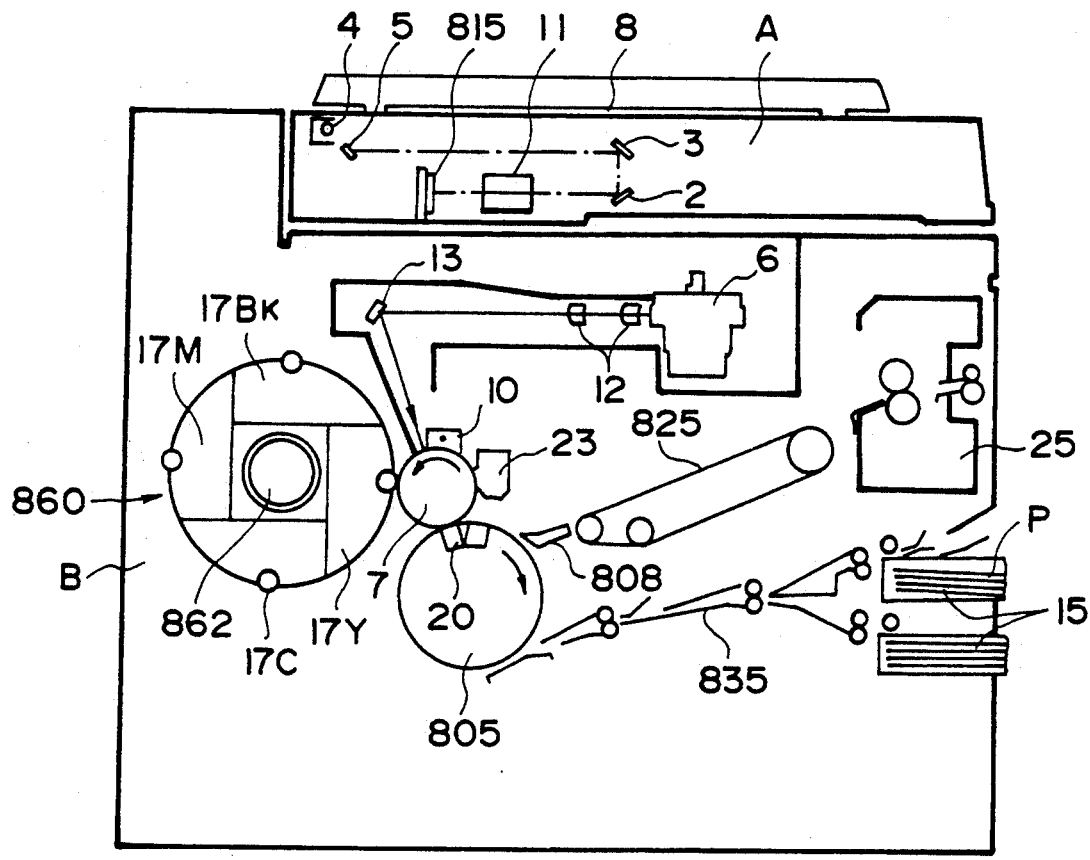
FIG. 6 is a sectional view of an image forming apparatus according to another embodiment of the present invention.

FIG. 4 shows a monochromatic image forming apparatus. The present invention is applicable to a full-color image forming apparatus a shown in FIG. 6.

The image forming apparatus is provided with an electrophotographic photosensitive drum 7 substantially at the center of the printer B. The photosensitive drum 7 is rotated in the counter-clockwise direction. Around the photosensitive drum 7, there is a primary charger 10 at the top, a transfer drum 805 at the bottom, a cleaning device 23 to the right and a rotary type developing device 860 to the left, the developing device 860 including four color developing means.

The reader A may be of any known type. In this embodiment, it comprises RGB color separating filters and a CCD image sensor 815. The reflected light image from the original scanned by first, second and third scanning mirrors 5, 3 and 2, is passed through the lens 11, and is color-separated by the RGB color separation filter. The separated components are then imaged on the color CCD image sensor. The images are produced into a red (R) image signal, a green (G) image signal, and a blue (B) image signal by the color CCD image sensor. They are converted by the A/D converter to digital signals for the respective R, G and B colors. The R, G and B digital signals are subjected to a logarithmic correction so that signals proportional to the light quantities of the R, G and B components are converted to respective density signals for Y (yellow), M (magenta) and C (cyan). Then, in a black signal generator (BK), a BK density signal to be produced as gray is produced from the Y, M, G signal levels. The thus produced Y, M, C and BK signals are supplied to the writer B.

In the writer B, the semiconductor laser is PWM-controlled for each of the color components Y, M, C and BK. The latent image for each of the colors is formed on the photosensitive drum 7 through a polygonal mirror 6, a lens 12, and a reflecting mirror 13.

The printer comprises a fixing device 25 and a sheet feeding device 15. Between the transfer drum 805 and the fixing device 25 and sheet feeding device 15, there are transfer sheet conveying systems 825 and 835, respectively.

The developing device 860 comprises four developing means containing respective color non-magnetic one component developers, i.e., a yellow developing means 17Y containing a yellow non-magnetic one component developer, a magenta developing means 17M containing a magenta non-magnetic one component developer, a cyan developing means 17C containing a cyan non-magnetic one component developer, and a black developing means 17BK using a black non-magnetic one component developer. For each of the latent image formations for the colors on the photosensitive drum a rotatable member 862 rotates to present the developing device corresponding to the latent image to the developing position to develop the latent image with the color non-magnetic one component developer into a visualized image. This is repeated. An example of the developing device is shown in FIG. 5.

A typical transfer device includes a transfer drum 805 having a gripper for gripping the transfer material and for retaining it on the periphery thereof. The transfer device grips the leading edge of a transfer sheet supplied through the transfer sheet conveying system from the sheet feeding device 17, and rotates it to receive the respective color toner images from the photosensitive drum 7 onto the transfer sheet. In the transfer region of the transfer drum 805, a transfer charger 20 is disposed.

The photosensitive drum 7 is subjected to the charging, exposure, development, transfer and cleaning operations for each of the colors to which the image is separated by the color separation filter.

The transfer sheet having sequentially received the respective color toner images is then released from the gripper and is separated from the transfer drum 805 by separation pawls 808. Then, the transfer sheet is fed into the fixing device 25 by the transfer sheet conveying system 825. In the fixing device 25, the toner images on the transfer sheet are fixed. Then, the transfer sheet is discharged to a tray.

The V-D property for each of the colors is shown in FIG. 7. For all of the colors, the linearity of the V-D curve is satisfactory without production of the negative property, and therefore, smooth halftone reproduction is accomplished. When the present invention is carried out in pictorial color copying machines, the smooth halftone reproduction is possible for each of the colors. Therefore, the high quality pictorial color images can be provided with a wide reproduction range. In the case of a full-color image in which plural images are superimposed, a high quality image can be accomplished with satisfactory tone reproduction.

In the foregoing embodiments, a semiconductor laser is used as the scanning and exposure means in the writer, but an LED array is usable as the exposure means in place thereof. In this case, a change in the length of the light potential dot appears in the direction of the photosensitive member movement (in the case of the laser beam scan, it appears in the movement direction of the laser beam, that is, in the direction substantially perpendicular to the movement of the photosensitive member).

The present invention also is applicable to a recording apparatus for recording image signals from a computer or the like.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus comprising:
   an electrophotographic photosensitive member;
   a light source;
   developing means for developing with a developer an electrostatic latent image formed on said photosensitive member by light from said light source, wherein the developer is a one component non-magnetic developer, wherein said developing means comprises a developer carrying member for carrying the developer to a developing zone to supply it to said photosensitive member in the developing zone, and a voltage source for applying a bias voltage to the developer carrying member, and wherein said voltage source applied to said developer carrying member a bias voltage in the form of a DC biased AC voltage; and
   control means responsive to image information to control a continuous light emitting period of said light source per one picture element, wherein said control means operates in a high contrast potential region, wherein the contrast potential is a difference between a potential of the bias voltage and an average potential of a latent image corresponding to a predetermined image density, and wherein the potential of the bias voltage is equal to a potential of a DC component of the DC biased AC voltage.

2. An apparatus according to claim 1, wherein said developing means further comprises a regulating member for regulating a thickness of a layer of the developer on said developer carrying member so as to have a thickness which is smaller than a minimum clearance between said photosensitive member and said developer carrying member in the developing zone.

3. An apparatus according to claim 1, wherein said light source is in the form of a semiconductor laser, and said control means controls a pulse width of a laser pulse in accordance with the image information.

4. An apparatus according to claim 1, wherein said developing means reverse-develops the electrostatic latent image.

5. An apparatus according to claim 1, wherein said developing means includes plural developing units for supplying different color developers to said photosensitive member, and wherein said developing units develop electrostatic latent images having corresponding colors.

6. An image forming apparatus comprising:
   an electrophotographic photosensitive member;
   a light source;
   a developing means for developing with a developer an electrostatic latent image formed on said photosensitive member by light from said light source, wherein the developer is a one component non-magnetic developer, wherein said developing means comprises a developer carrying member for carrying the developer to a developing zone to supply it to said photosensitive member in the developing zone, and a voltage source for applying an oscillating bias voltage to the developer carrying member; and
   control means responsive to image information to control a continuous light emitting period of said light source per one picture element, wherein said control means operates in a high contrast potential region, wherein the contrast potential is a difference between a potential of the bias voltage and an average potential of a latent image corresponding to a predetermined image density, and wherein the potential of the bias voltage is a time integration of the oscillating bias voltage in one period.

7. An apparatus according to claim 6, wherein said developing means further comprises a regulating member for regulating a thickness of a layer of the developer on said developer carrying member so as to have a thickness which is smaller than a minimum clearance between said photosensitive member and said developer carrying member in the developing zone.

8. An apparatus according to claim 6, wherein said light source is in the form of a semiconductor laser, and said control means controls a pulse width of a laser pulse in accordance with the image information.

9. An apparatus according to claim 6, wherein said developing means reverse-develops the electrostatic latent image.

10. An apparatus according to claim 6, wherein said developing means includes plural developing units for supplying different color developers to said photosensitive member, and wherein said developing units develop electrostatic latent images having corresponding colors.

* * * * *

UNITED STATES PATENT AND TRADEMARK OFFICE
CERTIFICATE OF CORRECTION

PATENT NO. : 5,257,075
DATED : October 26, 1993
INVENTOR(S) : Shigeru Ohki

It is certified that error appears in the above-indentified patent and that said Letters Patent is hereby corrected as shown below:

Column 1, line 35, change "lo" to --low--.
Column 8, line 13, change "applied" to --applies--.

Signed and Sealed this

Seventh Day of June, 1994

Attest:

BRUCE LEHMAN

Attesting Officer      Commissioner of Patents and Trademarks